(12) United States Patent
Nickle

(10) Patent No.: US 7,628,215 B2
(45) Date of Patent: Dec. 8, 2009

(54) HOOF PICK MEASURE TOOL

(76) Inventor: Sarah J. Nickle, P.O. Box 291, Warnerville, NY (US) 12187

( * ) Notice: Subject to any disclaimer, the term of this patent is extended or adjusted under 35 U.S.C. 154(b) by 248 days.

(21) Appl. No.: 11/899,701

(22) Filed: Sep. 7, 2007

(65) Prior Publication Data

US 2009/0065220 A1 Mar. 12, 2009

(51) Int. Cl.
*A01L 11/00* (2006.01)
*G01B 1/00* (2006.01)
*B43L 7/027* (2006.01)

(52) U.S. Cl. .......................... 168/45; 168/48.1; 33/511; 33/195; 33/474

(58) Field of Classification Search .................. 168/45, 168/47, 48.1; 33/511, 195, 474, 833, 836
See application file for complete search history.

(56) References Cited

U.S. PATENT DOCUMENTS

| | | | | |
|---|---|---|---|---|
| 513,574 A | * | 1/1894 | Hayden | ......................... 33/195 |
| 583,706 A | * | 6/1897 | Kearns et al. ................. 33/195 |
| 616,256 A | * | 12/1898 | Platt | ............................. 33/195 |
| 2,643,458 A | * | 6/1953 | Kellems | ....................... 33/474 |
| 4,214,370 A | * | 7/1980 | Beaston | ....................... 33/195 |
| 4,227,311 A | * | 10/1980 | Behney | ....................... 33/195 |
| 4,635,370 A | * | 1/1987 | Beaver | ..................... 33/558.01 |
| 4,999,922 A | * | 3/1991 | Loggins | ....................... 33/474 |
| 5,140,755 A | * | 8/1992 | Simmons, Jr. | ................ 33/474 |
| 5,170,570 A | * | 12/1992 | Mays, Jr. | ...................... 33/512 |
| 5,575,337 A | | 11/1996 | Sapyta | |
| 5,636,697 A | | 6/1997 | Pitchford | |
| 5,996,698 A | | 12/1999 | Behney | |
| 7,165,623 B2 | | 1/2007 | Healey | |

FOREIGN PATENT DOCUMENTS

DE 3503920 A1 * 12/1985

* cited by examiner

*Primary Examiner*—Son T. Nguyen

(57) ABSTRACT

A hoof pick measure tool that includes a hoof pick and a measuring body. The hoof pick may be used to remove foreign material from a horse's hoof. Additionally, the hoof pick measure tool further includes the measuring body. The measuring body includes at least one set of indicia linear measurement lines that allows a user to evaluate changes in dimensions of areas in the horse's hoof.

20 Claims, 16 Drawing Sheets

HOOF PICK MEASURE TOOL

BACKGROUND OF THE INVENTION

The present invention relates generally to horse hoof care tools. A horse hoof pick is used for removing foreign material from the horse's hoof. This foreign matter may include (e.g., dirt, clay, stones, etc.). The pick is used to pry this foreign matter from the horse hoof. Measurements of a horse's hoof may be taken to evaluate hoof growth.

SUMMARY OF THE INVENTION

The present invention provides a hoof pick measure tool that includes a hoof pick and a measuring body. The hoof pick may be used to remove foreign material from a horse's hoof. Additionally, the hoof pick measure tool further includes the measuring body. The measuring body allows a user to take measurements of the horse's hoof to evaluate changes in dimensions of areas in the horse's hoof. These dimensions may include (e.g., hoof width, hoof length, sole and frog proportions, concavity, central sulcus depth, collateral groove depth, heel height, bar height, hoof wall, white line thickness, etc.). These dimensions are important to evaluate hoof rehabilitation and hoof maintenance. By keeping a log of growth measurements, a user will be able to easily track a horses progress. Any horse owner or horse care provider or veterinarian will find the hoof pick measure tool a useful device.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
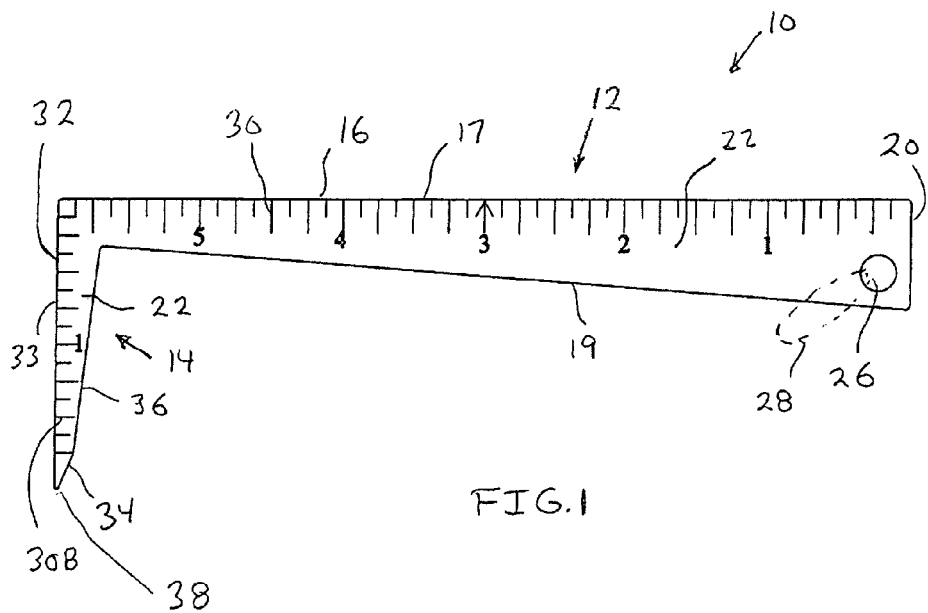
FIG. 1 illustrates a plan view of a first side of a hoof pick measure tool according to a preferred embodiment of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Figure 2:
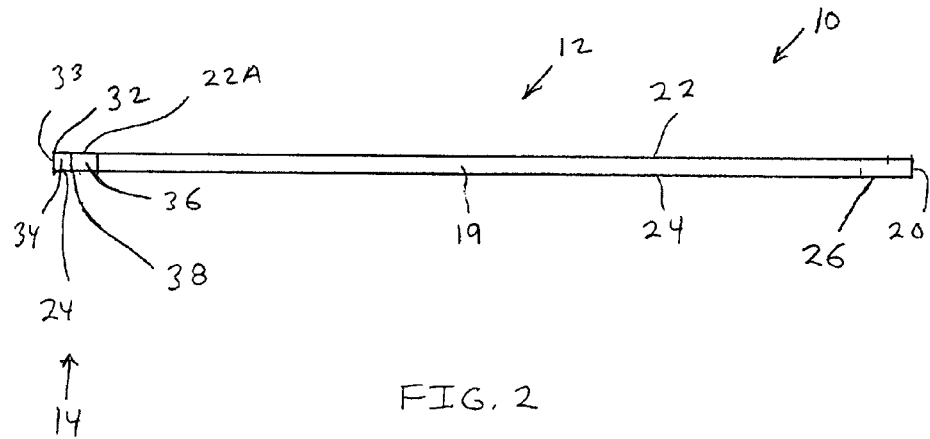
FIG. 2 illustrates a side view of the hoof pick measure tool of FIG. 1.
Figure 3:
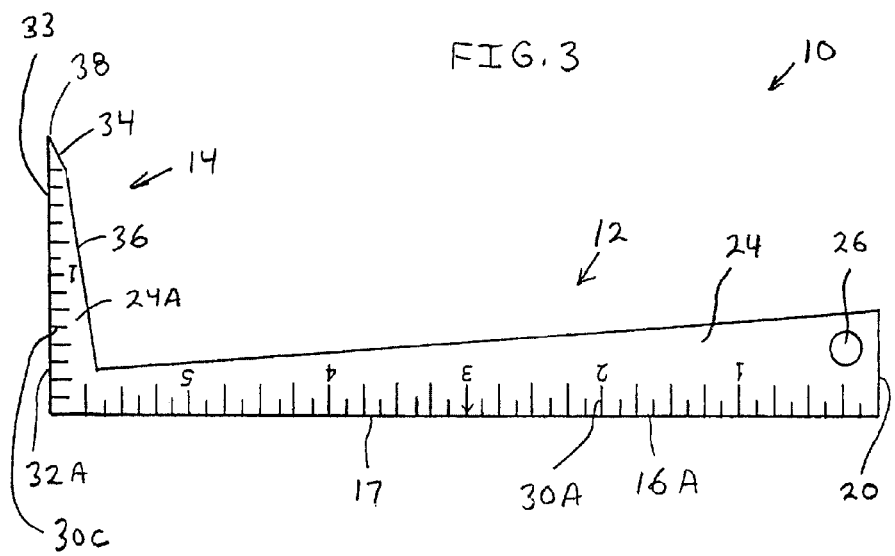
FIG. 3 illustrates a plan view of a second side of the hoof pick measure tool of FIG. 1.

A hoof pick measure tool 10 is shown in FIGS. 1, 2, and 3. The hoof pick measure tool 10 includes a measure body 12 and a pick body 14. The measure body 12 and the pick body 14 are adjacent to each other. The measure body 12 and the pick body 14 include a common first planer surface 22. The measure body 12 and the pick body 14 include a common second planer surface 24. The first planer surface 22 and the second planer surface 24 are parallel to each other. The measure body 12 includes a measure first straight edge 16, a measure first straight side 17, a measure second straight side 19, a measure second straight edge 16A and a measure end side 20. The measure first straight side 17 is perpendicular to the first planer surface 22 and the second planer surface 24. The measure first straight edge 16 is along the junction of the first planer surface 22 and the measure first straight side 17. The measure second straight side 19 is perpendicular to the first planer surface 22 and the second planer surface 24. The measure end side 20 is perpendicular to the first planer surface 22 and the second planer surface 24 and joins with the measure first straight side 17 and the measure second straight side 19. The measure body 12 may further include an opening 26. The opening passes between the first planer surface 22 and the second planer surface 24. The opening 26 may include any suitable opening (e.g., hole, oblong, etc.). As illustrated in FIG. 1, the opening 26 may be used to secure any suitable fastening device 28 (e.g., key ring, locking hook, etc.). The fastening device 28 may be used to demountably attach the hoof pick measure tool 10 to any suitable body (e.g., belt, wall hook, etc.).

As illustrated in FIG. 1, the first planer side 22 of the measure body 12 includes a first set of indicia 30 linear measurement lines on the first planer surface 22 along the measure straight edge 16. The first set of indicia 30 linear measurement lines may include any suitable linear indicia (e.g., English units, metric units, etc.).

As illustrated in FIG. 3, the measure second straight edge 16A of the measurement body 12 is along the junction of the second planer surface 24 and the measure first straight side 17. As illustrated in FIG. 3, the second planer surface 24 of the measure body 12 includes a third set of indicia 30A linear measurement lines on the second planer surface 24 along the measure second straight edge 16A. The third set of indicia 30A may include any suitable linear indicia (e.g., English units, metric units, etc.).

As illustrated in FIGS. 1-3, the pick body 14 includes a first pick straight edge 32, a second pick straight edge 32A, a pick straight side 33, a pick end straight side 34, a pick back straight side 36, the first planer surface 22 and the second planer surface 24. The measure body 12 and the pick body 14 are rigidly joined together to form the hoof pick measure tool 10. The measure body 12 and the pick body 14 may be formed from a same piece of material. The hoof pick measure tool 10 may be made from any suitable material (e.g., steel, stainless steel, brass, hard plastic, etc.). The pick straight side 33 is perpendicular to the first planer surface 22. The pick straight side 33 may be perpendicular to the measure straight side 17. The first pick straight edge 32 of the pick body 14 is along the junction of the pick straight side 33 and the first planer surface 22. The first pick straight edge 32 of the pick body 14 may be perpendicular to the measure straight edge 16 of the measure body 12. As illustrated in FIG. 1, the first planer surface 22 of the pick body 12 includes a second set of indicia 30B linear measurement lines along the first pick straight edge 32 of the pick body 14. The second set of indicia 30B linear measurement lines may include any suitable linear indicia (e.g., English units, metric units, etc.).

Figure 4:
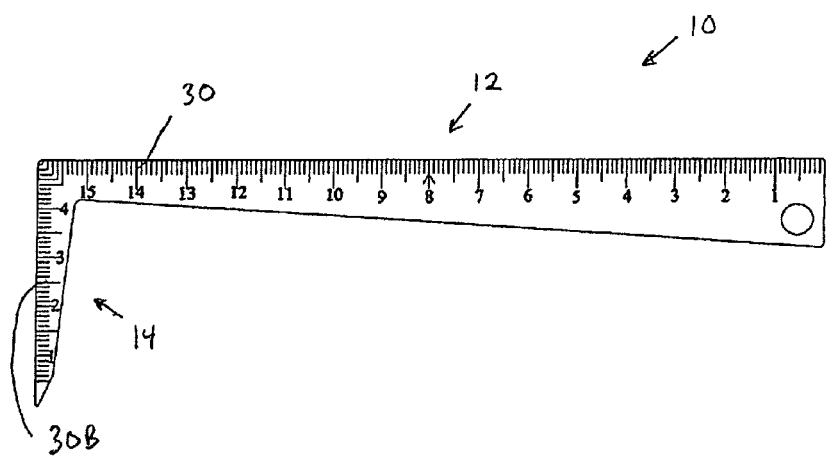
FIG. 4 illustrates a plan view of another embodiment of the hoof pick measure tool including a metric measurement scale.

As illustrated in FIG. 3, the second pick straight edge 32A of the pick body 14 is along the junction of the second planer surface 24 and the first pick straight side 33. As illustrated in FIG. 3, the second planer surface 24 of the pick body 14 includes a forth set of indicia 30C linear measurement lines along the second pick straight edge 32A of the pick body 14. The forth set of indicia 30C linear measurement lines may include any suitable linear indicia (e.g., English units, metric units, etc.). The indicia 30, 30A, 30B and 30C linear measurement lines may be applied by any suitable means (e.g., printing, scribing, laser cuts, etching, etc.) to the first planer surface 22 and the second planer surface 24 of the hoof pick measure tool 10. FIG. 4 illustrates the hoof pick measure tool 10 including indicia 30 and 30B linear measurement lines in metric units.

Figure 5:
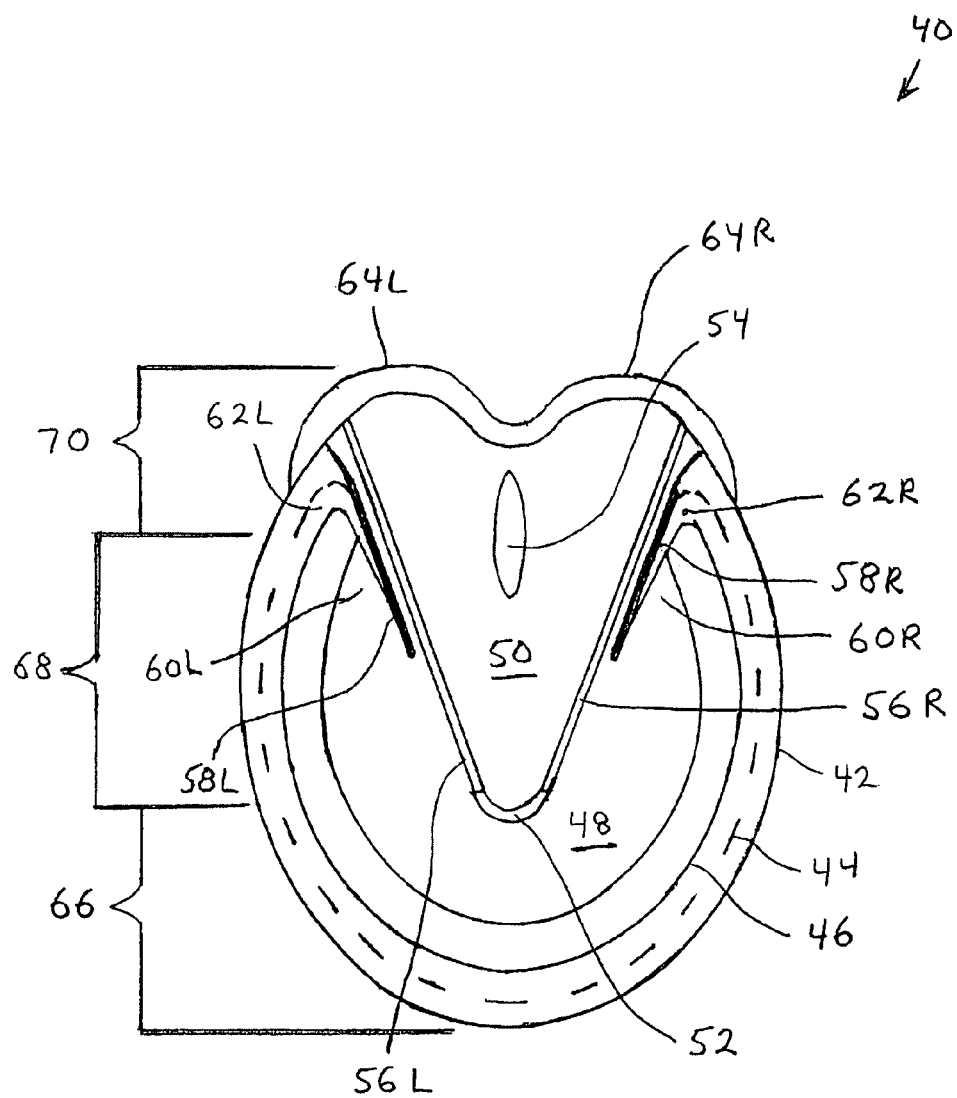
FIG. 5 illustrates a plan view of a horse hoof.

As illustrated in FIG. 1 and FIG. 3, the pick straight side 33 joins with the pick end straight side 34. The pick end straight side 34 joins with the measure second straight side 19. The pick straight side 33 and the pick end straight side 34 of the pick body 14 form a pick point 38. A user may use the pick point 38 to pry and loosen foreign matter (e.g., dirt, clay, mud, stones, etc.) from a horse hoof 40 (FIG. 5). The user may use the indicia 30, 30A, 30B and 30C linear measurement lines to measure portions of the horse hoof 40. The measure body 12 including the first set of indicia 30 linear measurement lines and the third set of indicia 30A linear measurement lines may include any suitable length of measure. Typically, the first set of indicia linear measurement lines 30 and the third set of indicia 30A linear measurement lines may cover a measurement range of about at least 5 inches. The pick body 14 including the third set of indicia 30B linear measurement lines and the forth set of indicia 30C linear measurement lines may include any suitable length of measure. Typically, the third set of indicia linear measurement lines 30B and the forth set of indicia 30C linear measurement lines on the pick body 14 may cover a measurement range of at least about 2 inches. The second set of indicia 30A linear measurement lines and the forth set of indicia 30C linear measurement lines may be optionally applied to the second planer surface 24 of hoof pick measure tool 10.

FIG. 5 illustrates a plan view of the horse hoof 40. The horse hoof 40 includes a wall 42, a water line 44, a white line 46, a sole 48, a frog 50, an apex of the frog 52, a central sulcus 54, a collateral groove 56R, a collateral groove 56L, a bar 58R, a bar 58L, a seat of corn 60R, a seat of corn 60L, a heel buttress 62R, a heel buttress 62L, a heel bulb 64R and a heel bulb 64L. The horse hoof 40 further includes a toe region 66, a quarter region 68 and a heel region 70.

Figure 6:
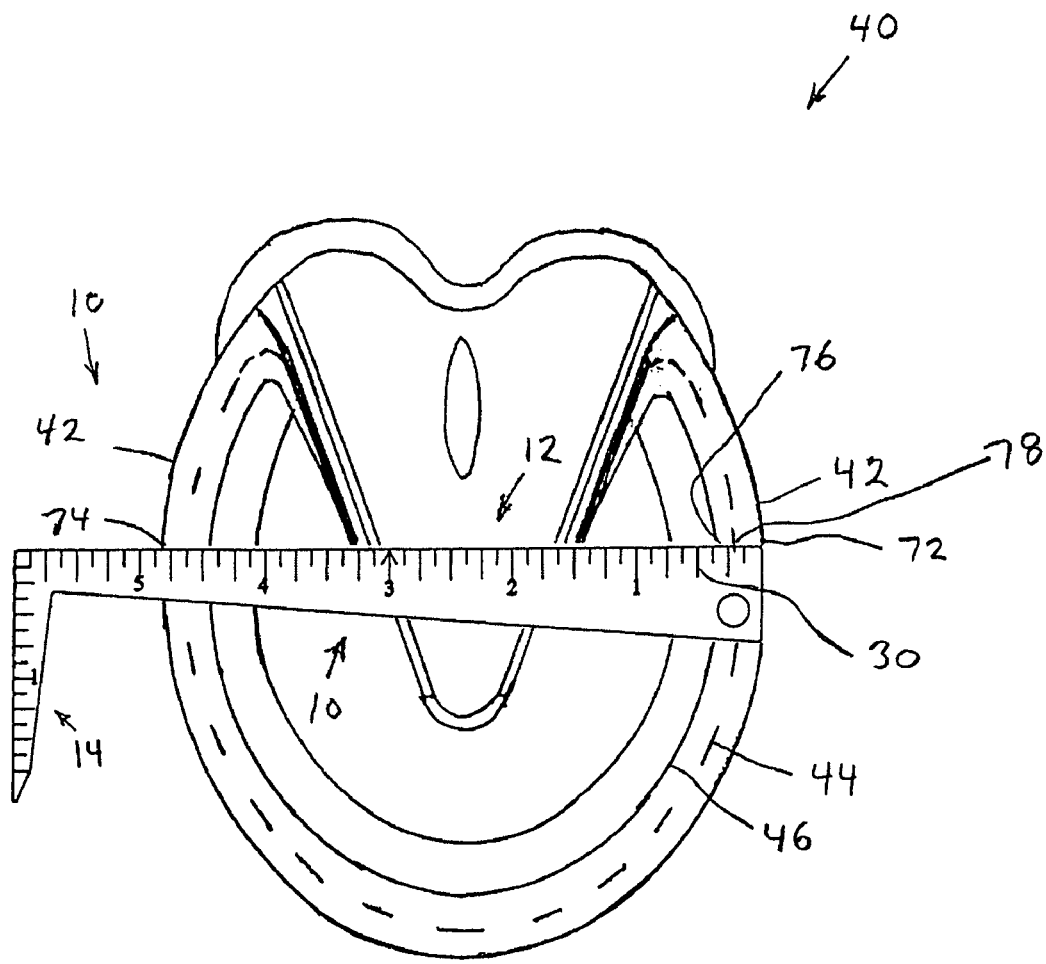
FIG. 6 illustrates a plan view of the horse hoof including using the hoof pick measure tool to measure a width of the horse hoof.

FIG. 6 illustrates a plan view of the horse hoof 40 including the hoof pick measure tool 10. The hoof pick measure tool 10 is being used to measure a total width of the horse hoof 40 between a location 72 and a location 74 on the wall 42. A zero reading line of the indicia 30 is placed on the location 72 and the total width reading of the horse hoof 40 is taken on the indicia 30 line adjacent to the location 74. Additionally, a measurement distance may be taken between the location 72 on the wall 42 and a location 76 on the white line 46. Additionally, a distance measurement may be taken between the location 72 on the wall 42 and the location 78 on the water line 44.

Figure 7:
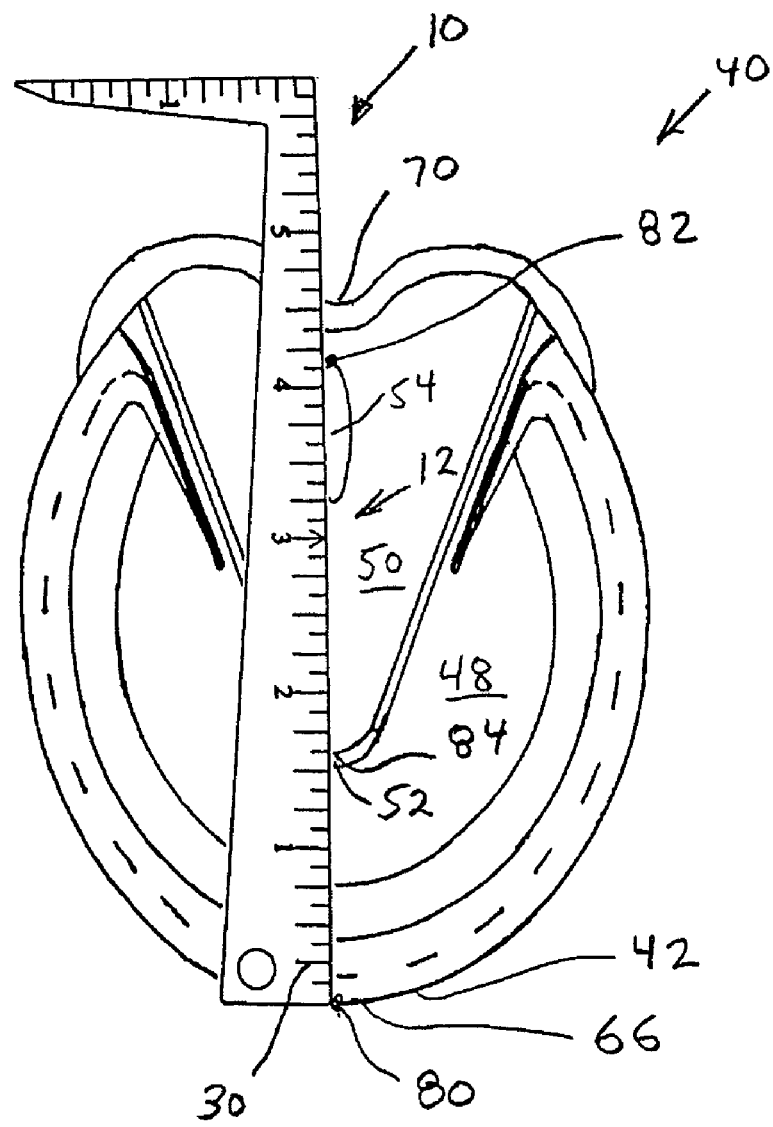
FIG. 7 illustrates a plan view of the horse hoof including using the hoof pick measure tool to measure a length of the horse hoof.

FIG. 7 illustrates a plan view of the horse hoof 40 including the hoof pick measure tool 10. The hoof pick measure tool 10 is being used to measure a length of the horse hoof 40 between a location 80 and a location 82. The location 80 is on the toe region 66 of the wall 42. The location 82 is on the central sulcus 54 closest to the heel region 70. The zero reading line of the first set of indicia 30 linear measurement lines is placed on the location 80 and the total length of the horse hoof 40 reading is taken on the indicia 30 line adjacent to the location 82. Additionally, a distance measurement may be taken between the location 80 and a location 84. The location 80 is on the toe region 66 of the wall 42. The location 84 is on the apex of the frog 52. Additionally, a distance measurement may be taken between the location 84 and the location 82. A proportion of sole 48 to frog 50 may be determined by dividing the distance between locations 80 and 84 by the distance between locations 84 and 82.

Figure 8:
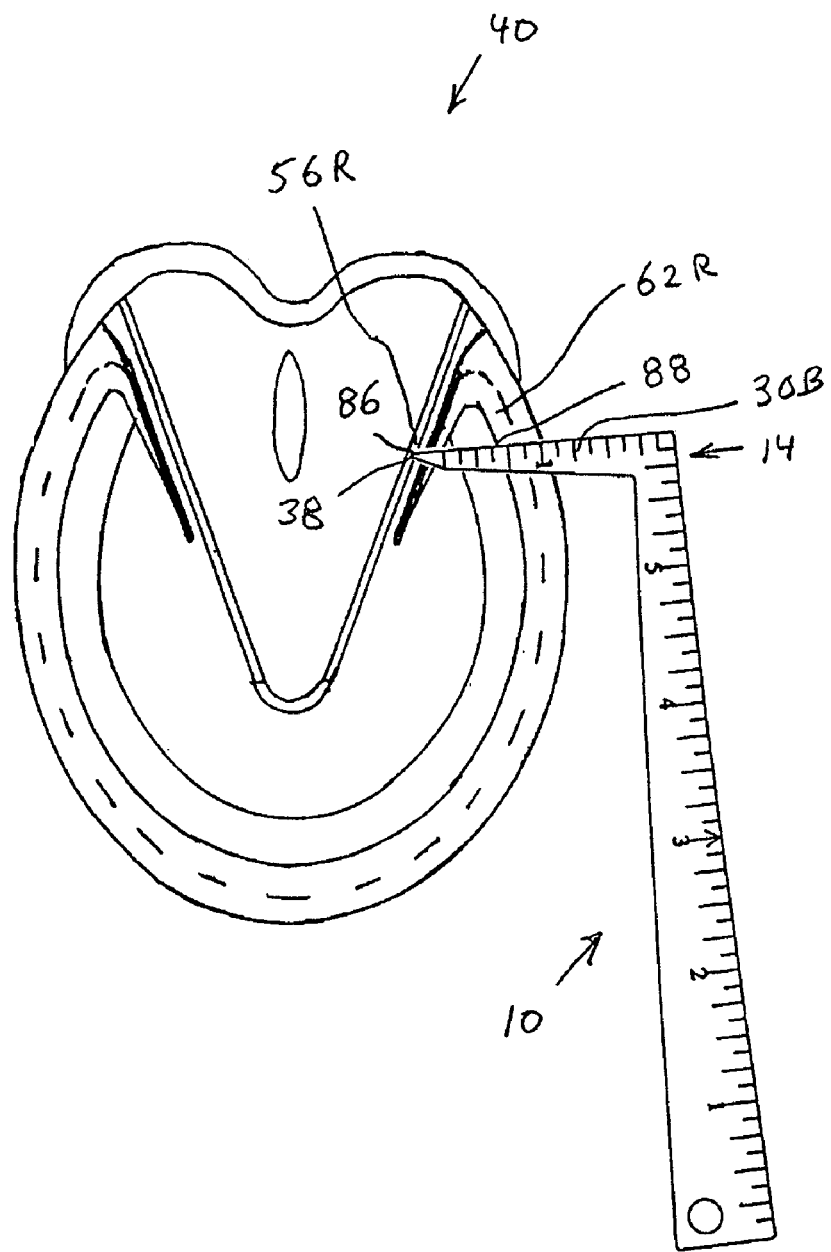
FIG. 8 illustrates a plan view of the horse hoof including using the hoof pick measure tool to measure a heel height from a bottom of the collateral groove.

FIG. 8 illustrates a plan view of the horse hoof 40 including the hoof pick measure tool 10. The hoof pick measure tool 10 is being used to measure a height of the heel buttress 62 R above the collateral groove 56R between a location 86 and a location 88. The location 86 is at a bottom of the collateral groove 56R. The location 88 is on the heel buttress 62R. The pick point 38 is placed at the location 86. The second set of indicia 30B linear measurement lines on the pick body 14 are used to measure the height of the heel buttress 62R above the collateral groove 56R between the location 86 and the location 88.

Figure 9:
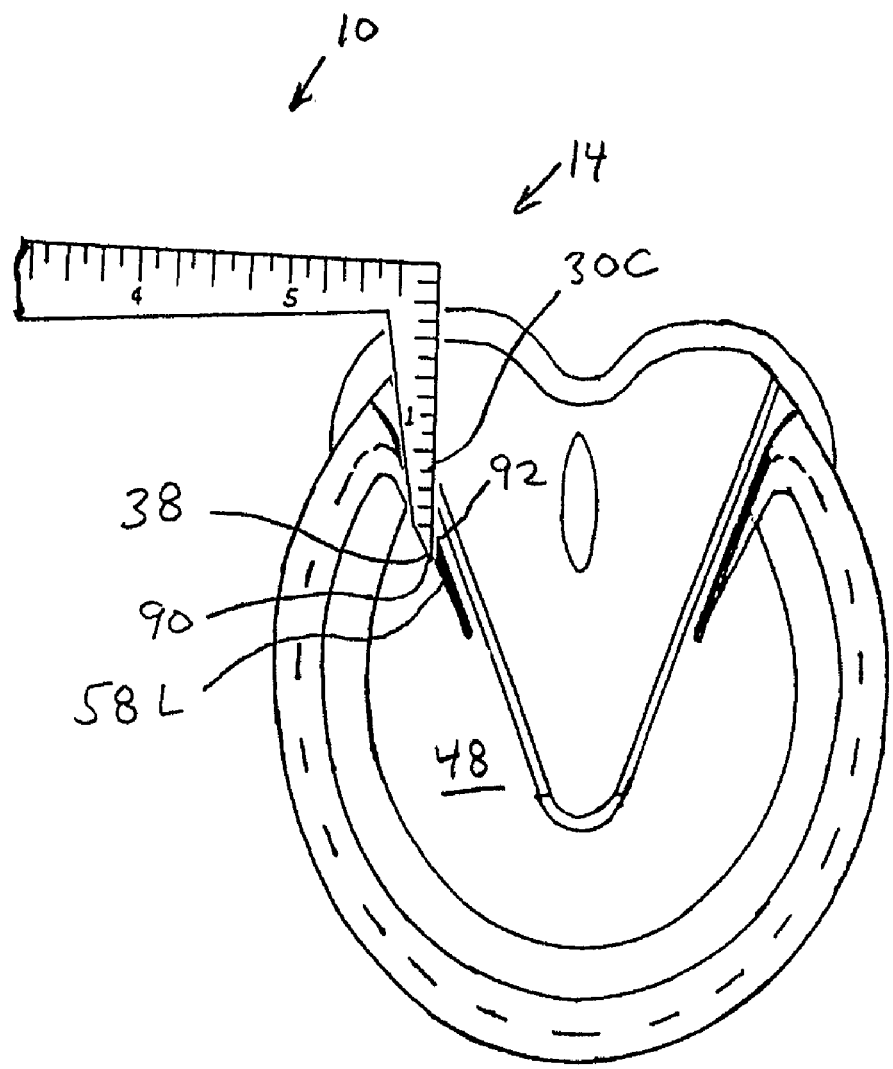
FIG. 9 illustrates a plan view of the horse hoof including using the hoof pick measure tool to measure a bar height.

FIG. 9 illustrates a plan view of the horse hoof 40 including the hoof pick measure tool 10. The hoof pick measure tool 10 is being used to measure a height of the bar 58L between a location 90 and a location 92. The location 90 is at an intersection between the bar 58 L and the sole 48. The location 92 is at an top point of the bar 58L. The pick point 38 is placed at the location 90. The forth set of indicia 30C linear measurement lines on the pick body 14 are used to measure the height of the bar 59L between the location 90 and the location 92.

Figure 10:
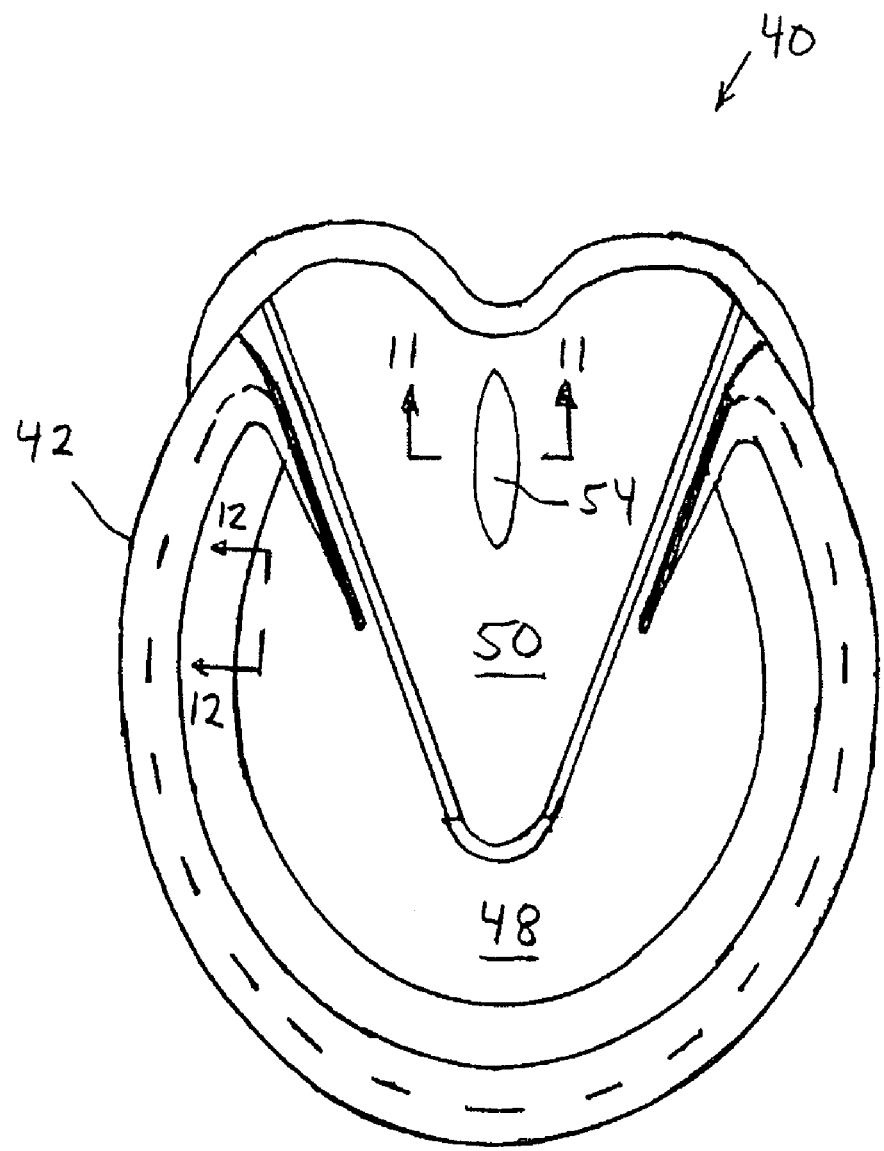
FIG. 10 illustrates a plan view of the horse hoof.
Figure 11:
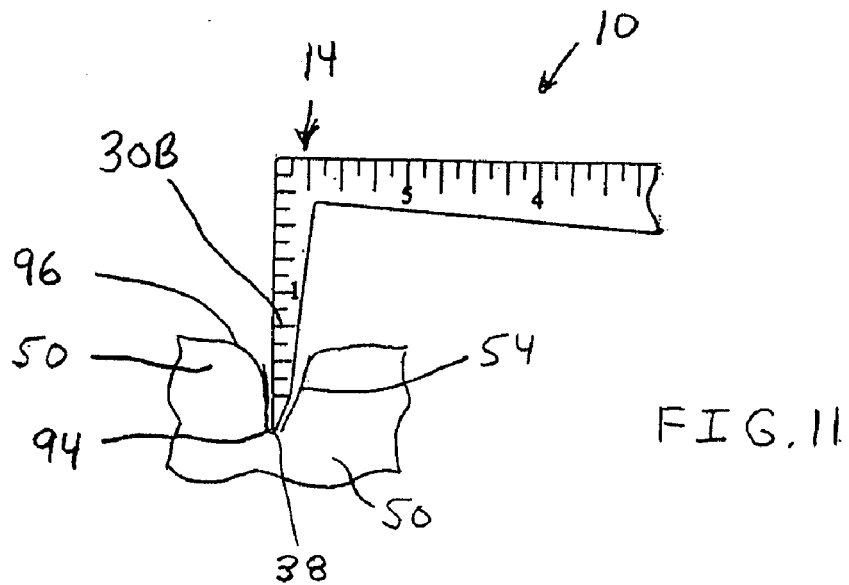
FIG. 11 illustrates a fragmentary cross-sectional view of the horse hoof taken along line 11-11 of FIG. 10 including using the hoof pick measure tool to measure a central sulcus depth.

FIG. 11 illustrates a fragmentary cross-sectional view of the horse hoof 40 taken along line 11-11 of FIG. 10. The hoof pick measure tool 10 is being used to measure a depth of the center sulcus 54 between a location 94 and a location 96. The location 94 is at the bottom of the center sulcus 54. The location 96 is at the top of the frog 50. The pick point 38 is placed at the location 94. The second set of indicia 30B linear measurement lines on the pick body 14 are used to measure the depth of the center sulcus between the location 94 and the location 96.

Figure 12:
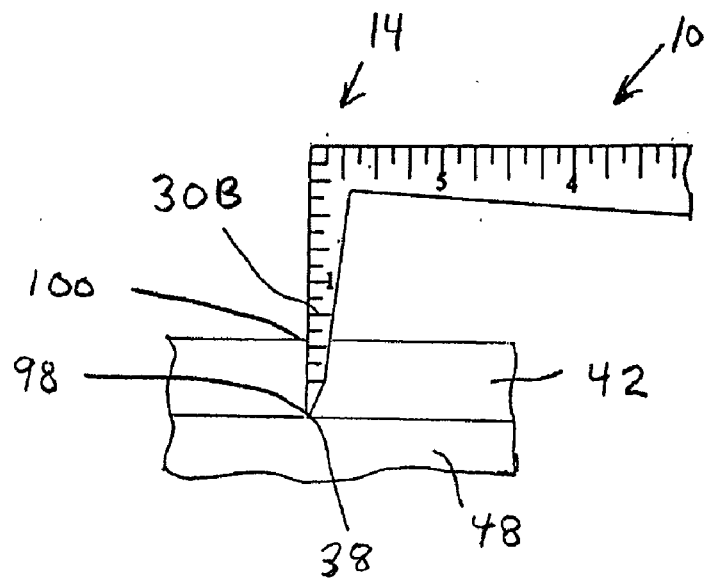
FIG. 12 illustrates a fragmentary cross-sectional view of the horse hoof taken along line 12-12 of FIG. 10 including using the hoof pick measure tool to measure a wall height of the horse hoof.

FIG. 12 illustrates a fragmentary cross-sectional view of the horse hoof 40 taken along line 12-12 of FIG. 10. The hoof pick measure tool 10 is being used to measure a height of the wall 42 between a location 98 and a location 100. The location 98 is on the sole 48. The location 100 is at the top of the wall 42. The pick point 38 is placed at the location 98. The second set of indicia 30B linear measurement lines on the pick body 14 are used to measure the height of the wall between the location 98 and the location 100.

Figure 13:
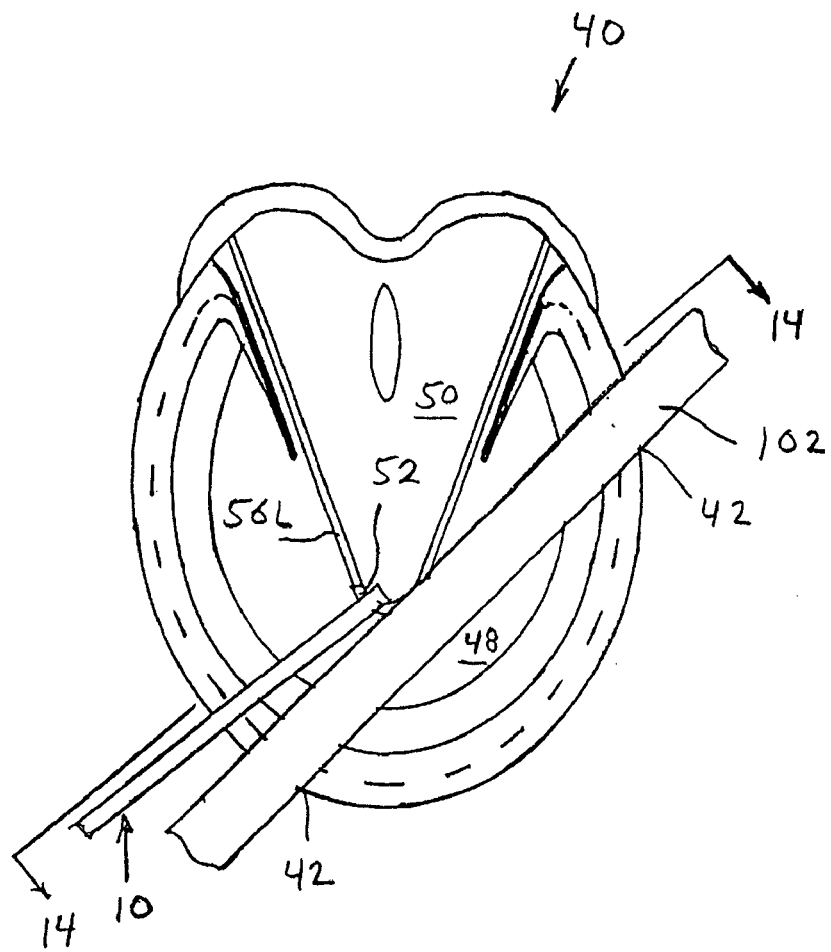
FIG. 13 illustrates a plan view of the horse hoof including the hoof pick measure tool and a flat surface reference device.
Figure 14:
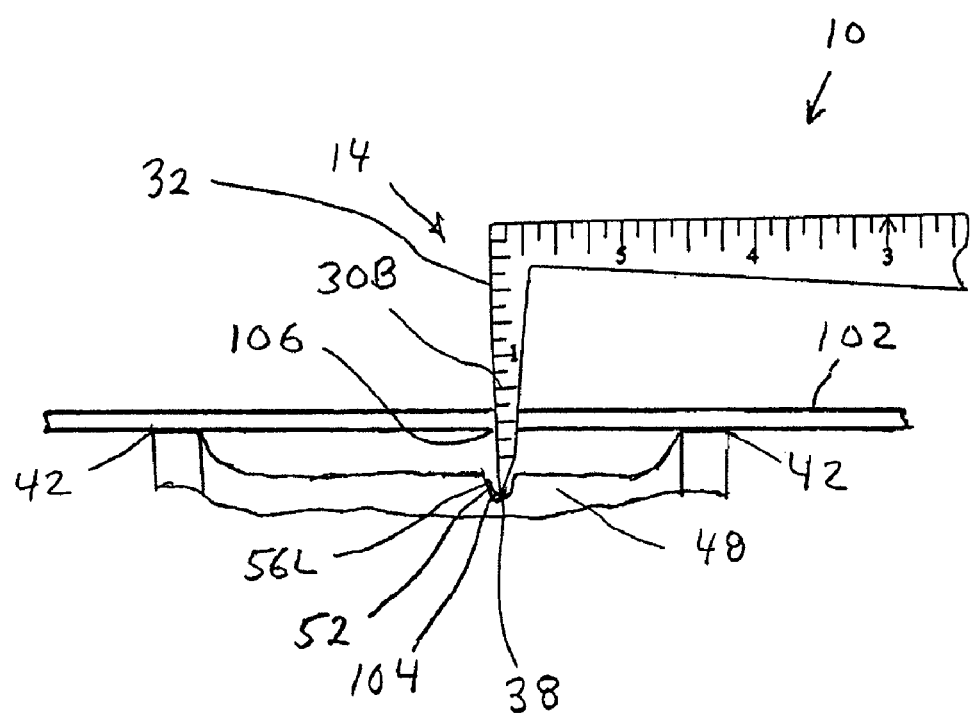
FIG. 14 illustrates a fragmentary cross-sectional view of the horse hoof taken along line 14-14 of FIG. 13, including using the hoof pick measure tool to measure a collateral groove depth at an apex of a frog of the horse hoof.

FIG. 14 illustrates a fragmentary cross-sectional view of the horse hoof 40 taken along line 14-14 of FIG. 13. As illustrated in FIGS. 13 and 14, a flat surface reference device 102 rests upon the wall 42. The flat surface reference device 102 may be any suitable device (e.g., a flat member, a flat bar, etc.). The hoof pick measure tool 10 is being used to measure a depth of the collateral groove 56L at the apex of the frog 52 between a location 104 and a location 106. The location 104 is in the apex of the frog 52. The pick point 38 is placed at the location 104. The location 106 is at an intersection of the flat surface reference device 102 and the straight edge 32 of the pick body 14. The second set of indicia 30B linear measurement lines on the pick body 14 are used to measure the depth of the collateral groove 56L at the apex of the frog 52 between the location 104 and the location 106.

Figure 15:
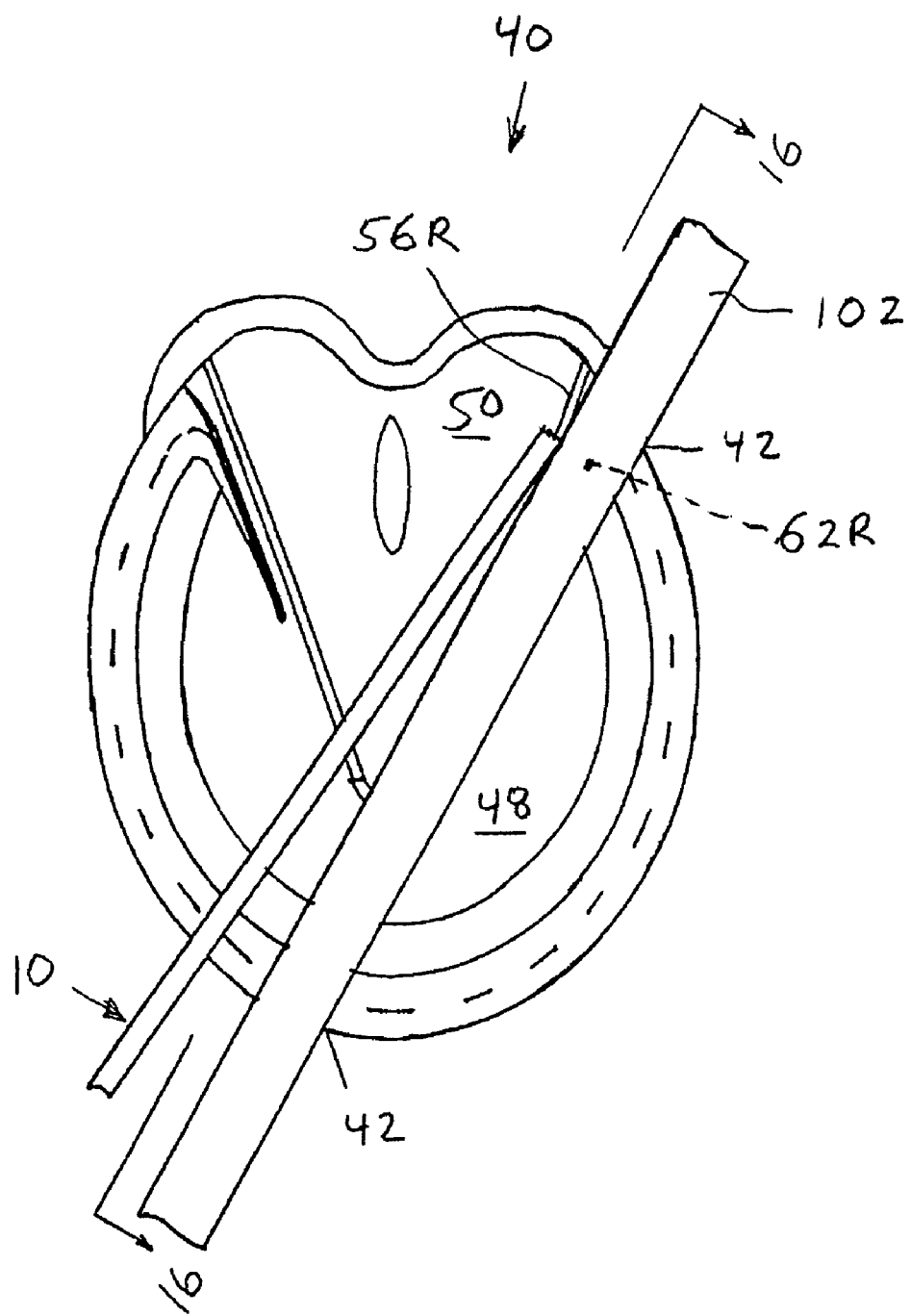
FIG. 15 illustrates a plan view of the horse hoof including the hoof pick measure tool and the flat surface reference device.
Figure 16:
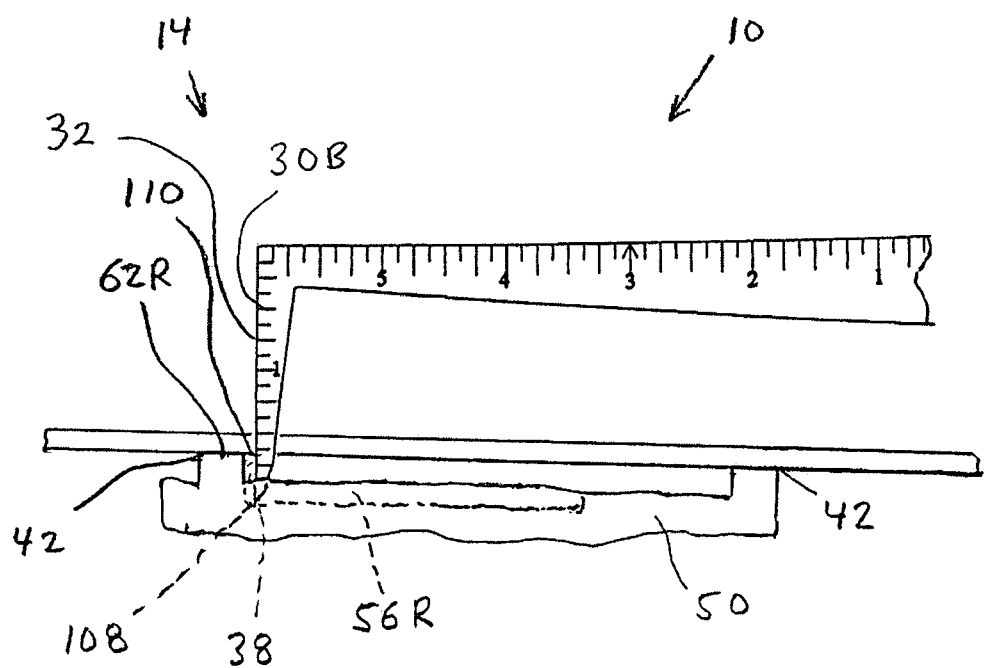
FIG. 16 illustrates a fragmentary cross-sectional view of the horse hoof taken along line 16-16 of FIG. 15, including using the hoof pick measure tool to measure the collateral groove depth toward a heel portion of the horse hoof.

FIG. 16 illustrates a fragmentary cross-sectional view of the horse hoof 40 taken along line 16-16 of FIG. 15. As illustrated in FIGS. 15 and 16, the flat surface reference device 102 rests upon the wall 42. The hoof pick measure tool 10 is being used to measure a depth of the collateral groove 56R near the heel buttress 62R between a location 108 and a location 110. The location 108 is at the bottom of the collateral groove 56R near the heel buttress 62R. The pick point 38 is placed at the location 108. The location 110 is at an intersection of the flat surface reference device 102 and the straight edge 32 of the pick body 14. The second set of indicia 30B linear measurement lines on the pick body 14 are used to measure the depth of the collateral groove 56R near the heel buttress between the location 108 and the location 110.

Figure 17:
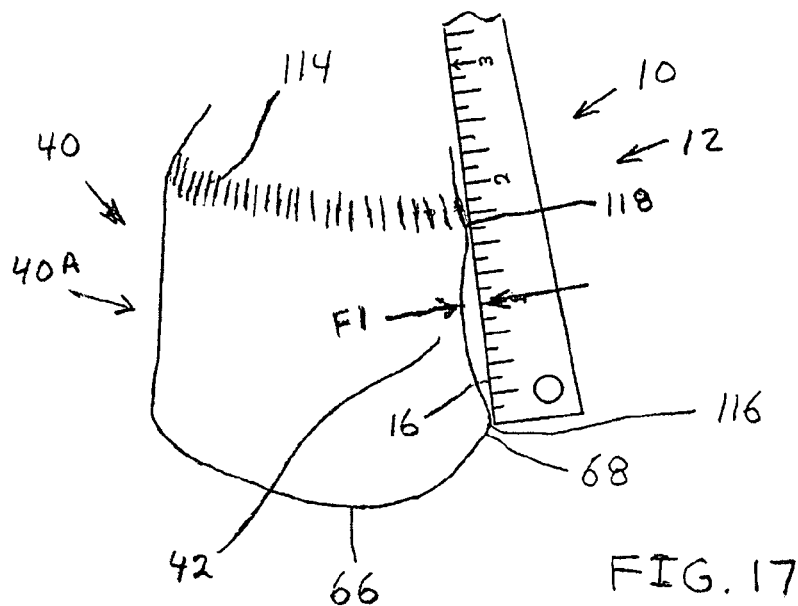
FIG. 17 illustrates a perspective view of an outside portion of the horse hoof including using the hoof pick measure to measure flare on a quarter portion of the hoof wall.

FIG. 17 illustrates a perspective view of an outside portion 40A of the horse hoof 40. The outside portion 40A includes the toe region 66, the quarter region 68, the wall 42, and a coronary band 114. The straight edge 16 of the measure body 12 of the horse pick measure tool may be placed between a location 116 and a location 118. The location 116 is at a lower edge of the wall 42 at the quarter region 68. The location 118 is on the coronary band 114. A flare distance "F1" (FIG. 17) between the wall 42 and the straight edge 16 may be observed and measured.

Figure 18:
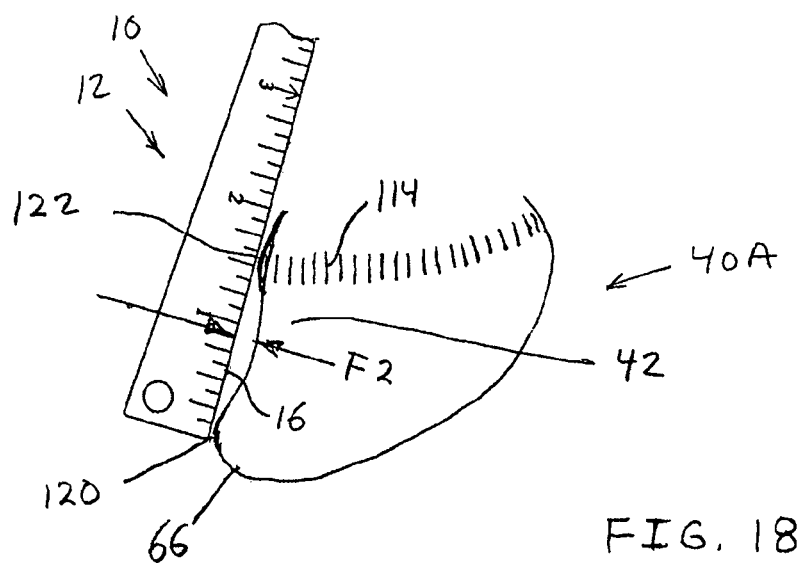
FIG. 18 illustrates a perspective view of the outside portion of the horse hoof including using the hoof pick measure to measure flare on a toe portion of the horse hoof wall.

FIG. 18 illustrates a perspective view of the outside portion 40A of the horse hoof 40. The straight edge 16 of the measure body 12 of the horse pick measure tool 10 may be placed between a location 120 and a location 122. The location 120 is at a lower edge of the wall 42 at the toe region 66. The location 122 is on the coronary band 114. A flare distance "F2" (FIG. 18) between the wall 42 and the straight edge 16 may be observed and measured.

Figure 19:
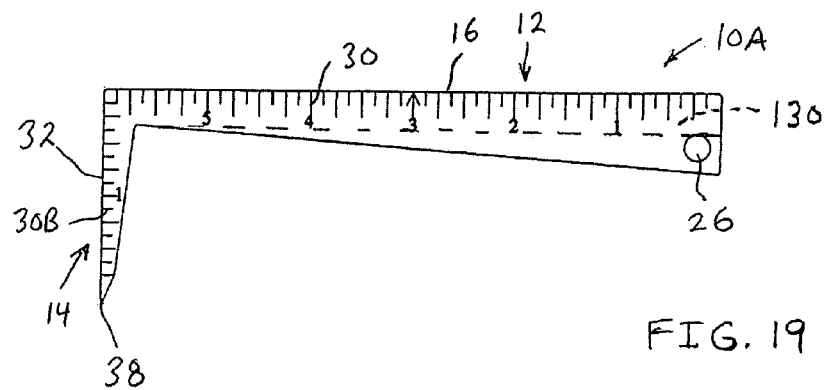
FIG. 19 illustrates a plan view of another embodiment of a hoof pick measure including a rasp device.
Figure 20:
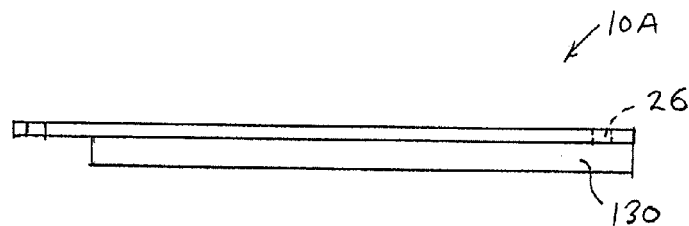
FIG. 20 illustrates a side view of the hoof pick measure of FIG. 19.
Figure 21:
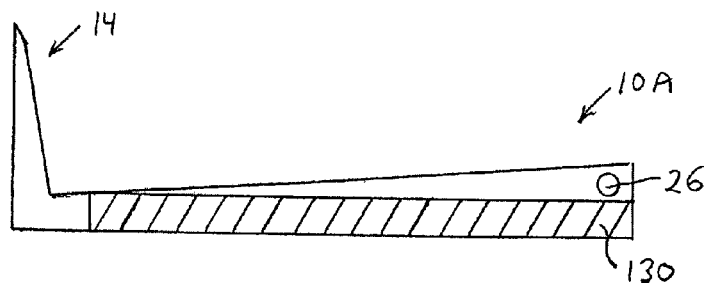
FIG. 21 illustrates a plan view of the hoof pick showing the rasp device of the hoof pick measure of FIG. 19.

FIGS. 19, 20 and 21 illustrate another embodiment of a hoof pick measure tool 10A. The hoof pick measure tool 10A includes the measure body 12, the pick body 14 and a rasp device 130. The rasp device 130 is rigidly attached to the measure body 12 of the hoof pick measure tool 10A. The rasp device 130 may be any suitable rasp (e.g., file, abrasive surface, diagonal grooves, square grooves, etc.). The measure body 12 includes the straight edge 16 and first set of indicia 30 linear measurement lines. The pick body 14 includes the straight edge 32, the second set of indicia 30B linear measurement lines and the pick point 38. The measure body 12 may further include the opening 26. The opening 26 may be used to secure any suitable fastening device 28 (not shown). The fastening device 28 may be used to demountably attach the hoof pick measure tool 10A to any suitable body (e.g., belt, wall hook, etc.). The rasp device 130 may be used to file down any suitable portion of the horse hoof 40.

Figure 22:
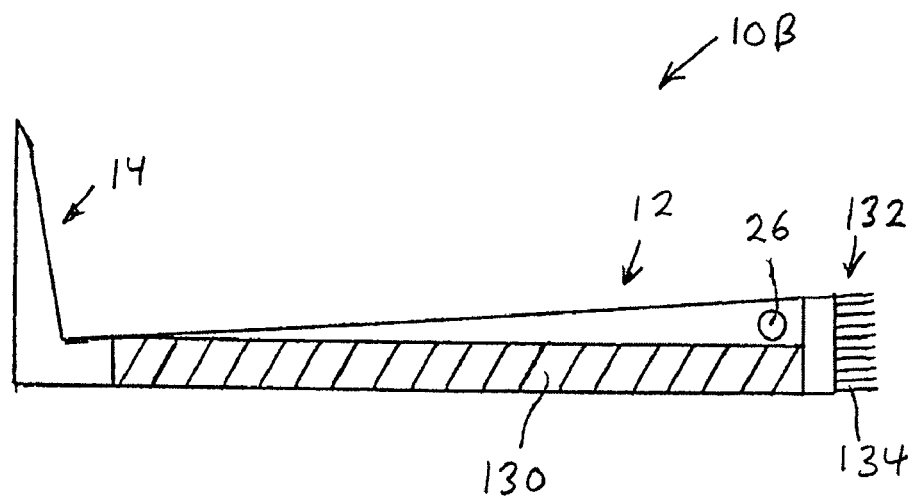
FIG. 22 illustrates another embodiment of a horse pick measure further including a hoof brush apparatus.

FIG. 22 illustrates a plan view of another embodiment of a hoof pick measure tool 10B. The hoof pick measure tool 10B includes the measure body 12, the pick body 14, the rasp device 130 and a brush device 132. The brush device 132 is rigidly attached to the measure body 12. The brush device 132 includes a brush 134. The brush 134 may be used to help brush foreign matter from the horse hoof 40.

Figure 23:
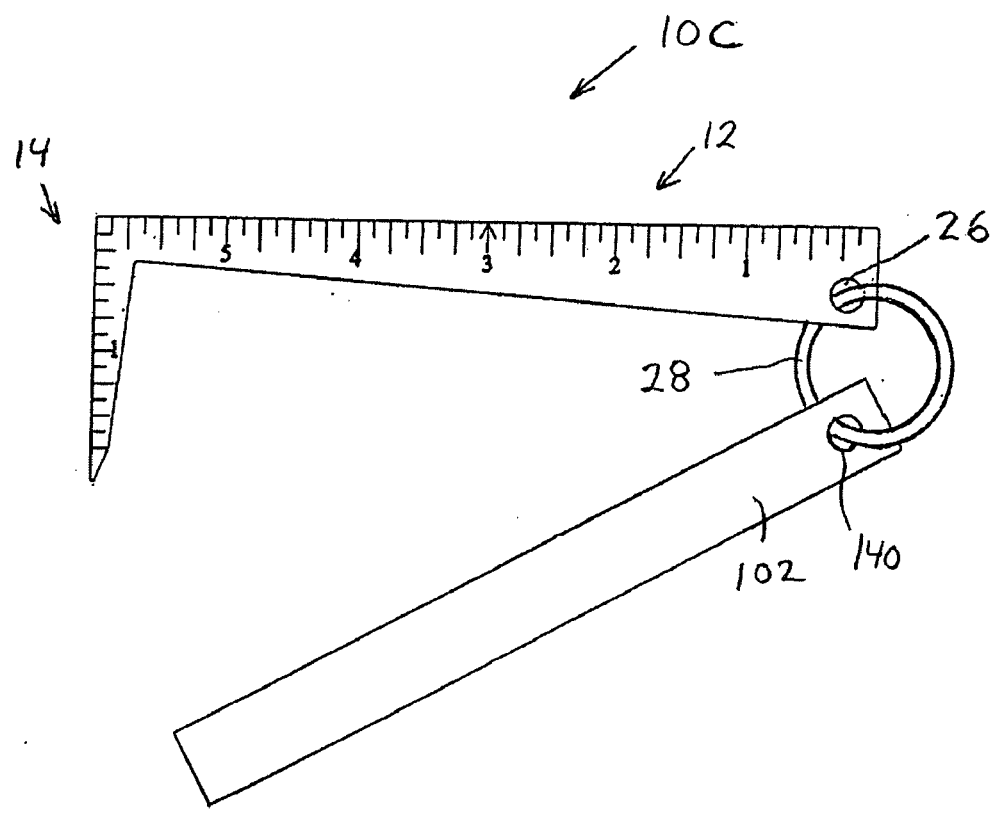
FIG. 23 illustrates another embodiment of a horse pick measure further including a key ring apparatus and the flat surface reference device.

FIG. 23 illustrates a plan view of another embodiment of a hoof pick measure tool 10C. The hoof pick measure tool 10C includes the measure body 12, the pick body 14, the opening 26, the fastening device 28 and the flat surface reference device 102. The flat surface reference device 102 may be any suitable device (e.g., a flat member, a flat bar, etc.). The flat surface reference device 102 includes an opening 140. The fastening device 28 passes through the opening 26 and the opening 140. The fastening device 28 removably connects the measure body 12 and the straight edge device 102. The fastening device may be any suitable device (e.g., key ring, locking hook, etc.). The flat surface reference device 102 may be disconnected from the measure body and may be used to assist in horse hoof 40 measurements.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

I claim:

1. A hoof pick measure tool comprising:
   a measure body including a first planer surface, a second planer surface, wherein the first planer surface is parallel to the second planer surface, a measure first straight side perpendicular to the first planer surface and the second planer surface, a first measure straight edge along a junction of the measure first straight side and the first planer surface and a first set of indicia linear measurement lines along the first measure straight edge on the first planer surface of the measure body; and
   a pick body adjoining the measure body including the first planer surface, the second planer surface, a pick straight side perpendicular to the first planer surface and the second planer surface, the pick straight side joining with the measure first straight side, the pick straight side perpendicular to the measure first straight side, a first pick straight edge along a junction of the pick straight side and the first planer surface, a second set of indicia linear measurement lines along the first pick straight edge on the first planer surface of the pick body, a pick end straight side joined with the pick straight side, and a pick point formed by the intersection of the pick straight side and a pick end straight side.

2. The hoof pick measure tool of claim 1, wherein the measure body further includes a third set of indicia linear measurement lines on the second planer surface.

3. The hoof pick measure tool of claim 1, wherein the pick body further includes a fourth set of indicia linear measurement lines on the second planer surface.

4. The hoof pick measure tool of claim 1, further including an opening in the measure body to attach a fastening device.

5. The hoof pick measure tool of claim 1, wherein the measure body and the pick body are made from a material selected from a group consisting of steel, stainless steel, brass, and hard plastic.

6. The hoof pick measure tool of claim 1, wherein the indicia linear measurement lines are selected from a group consisting of English units, and metric units.

7. The hoof pick measure tool of claim 1, wherein each set of indicia linear measurement lines are applied to the first planer surface and the second planer surface selected from a group consisting of printing, scribing, laser cuts, and etching.

8. The hoof pick measure tool of claim 1, further including a rasp device attached to the second planer surface of the measure body.

9. The hoof pick measure tool of claim 1, further including a brush device attached to the measure body.

10. The hoof pick measure tool of claim 1, further including a flat surface reference device demountably attached to the measure body.

11. A method of measuring a horse hoof comprising the steps of:
providing a measure body including a first planer surface, a second planer surface, wherein the first planer surface is parallel to the second planer surface, a measure first straight side perpendicular to the first planer surface and the second planer surface, a first measure straight edge along a junction of the measure first straight side and the first planer surface and a first set of indicia linear measurement lines along the first measure straight edge on the first planer surface of the measure body; and a pick body adjoining the measure body including the first planer surface, the second planer surface, a pick straight side perpendicular to the first planer surface and the second planer surface, the pick straight side joining with the measure first straight side, the pick straight side perpendicular to the measure first straight side, a first pick straight edge along a junction of the pick straight side and the first planer surface, a second set of indicia linear measurement lines along the first pick straight edge on the first planer surface of the pick body, a pick end straight side joining with the pick straight side, and a pick point formed by the intersection of the pick straight side and the pick end straight side;
placing a first set of indicia linear measurement lines of the measure body over a horse hoof; and
using the first set of indicia linear measurement lines of the measure body to read a length of the horse hoof.

12. The method of claim 11, further including:
placing the first set of indicia linear measurement lines of the measure body over the horse hoof to measure a width of the horse hoof.

13. The method of claim 11, further including:
placing a tip of the pick body at the bottom of a collateral groove of the horse hoof; and
using the second set of indicia linear measurement lines on the pick body to read a height of a heel buttress.

14. The method of claim 11, further including:
placing a tip of the pick body on a sole of the horse hoof; and
using the second set of indicia linear measurement lines on the pick body to read a height of a bar on the horse hoof.

15. The method of claim 11, further including:
placing a tip of the pick body on a bottom of a center sulcus; and
using the second set of indicia linear measurement lines on the pick body to read a depth of the center sulcus.

16. The method of claim 11, further including:
placing a tip of the pick body on the bottom of a sole of the horse hoof; and
using the second set of indicia linear measurement lines on the pick body to measure a height of a wall of the horse hoof.

17. The method of claim 11, further including:
placing a flat surface reference device over a wall of the horse hoof;
placing a tip of the pick body in the apex of the frog of the horse hoof; and
using the second set of indicia linear measurement lines on the pick body to measure a height from the apex of the frog to the flat surface reference device.

18. The method of claim 11, further including:
placing a flat surface reference device over a wall of the horse hoof:
placing a tip of the pick body in a collateral groove of the horse hoof: and
using the second set of indicia linear measurement lines on the pick body to measure a depth of the collateral groove from the collateral groove to the flat surface reference device.

19. A method of measuring a horse hoof comprising the steps of:
providing a measure body including a first planer surface, a second planer surface, wherein the first planer surface is parallel to the second planer surface, a measure first straight side perpendicular to the first planer surface and the second planer surface, a first measure straight edge along a junction of the measure first straight side and the first planer surface and a first set of indicia linear measurement lines along the first measure straight edge on the first planer surface of the measure body; and a pick body adjoining the measure body including the first planer surface, the second planer surface, a pick straight side perpendicular to the first planer surface and the second planer surface, the pick straight side joining with the measure first straight side, the pick straight side perpendicular to the measure first straight side, a first pick straight edge along a junction of the pick straight side and the first planer surface, a second set of indicia linear measurement lines along the first pick straight edge on the first planer surface of the pick body, a pick end straight side joining with the pick straight side, and a pick point formed by the intersection of the pick straight side and the pick end straight side;

placing the measure first straight side of the measure body on an outside wall of a horse hoof in a quarter region of a hoof; and measuring a flare distance between the outside wall and the measure first straight side of the measure body.

20. The method of claim 19, further including:

placing the measure first straight side of the measure body on the outside wall of the horse hoof in a toe region of the hoof; and measuring the flare distance between the outside wall and the measure first straight side of the measure body.

* * * * *